(12) United States Patent
Sekhar

(10) Patent No.: US 11,443,047 B2
(45) Date of Patent: Sep. 13, 2022

(54) SYSTEMS AND METHODS FOR USE IN VALIDATING ARTIFACTS FOR DEPLOYMENT

(71) Applicant: MASTERCARD INTERNATIONAL INCORPORATED, Purchase, NY (US)

(72) Inventor: Rakhesh Sekhar, St. Louis, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 86 days.

(21) Appl. No.: 16/853,190

(22) Filed: Apr. 20, 2020

(65) Prior Publication Data

US 2021/0326454 A1 Oct. 21, 2021

(51) Int. Cl.
| | | |
|---|---|---|
| *H04L 29/06* | (2006.01) | |
| *G06F 21/60* | (2013.01) | |
| *H04L 9/32* | (2006.01) | |
| *G06F 21/44* | (2013.01) | |
| *G06F 21/64* | (2013.01) | |

(52) U.S. Cl.
CPC .............. *G06F 21/60* (2013.01); *G06F 21/44* (2013.01); *G06F 21/64* (2013.01); *H04L 9/3239* (2013.01)

(58) Field of Classification Search
None
See application file for complete search history.

(56) References Cited

U.S. PATENT DOCUMENTS

| | | | | |
|---|---|---|---|---|
| 9,558,098 | B1* | 1/2017 | Alshayeb | G06F 11/3604 |
| 10,613,970 | B1* | 4/2020 | Jammula | G06F 11/3688 |
| 10,698,668 | B1* | 6/2020 | Pohlack | G06F 8/71 |
| 10,929,226 | B1* | 2/2021 | Miller | G06F 21/64 |
| 11,010,233 | B1* | 5/2021 | Golden | G06F 21/64 |
| 11,017,389 | B2* | 5/2021 | Patni | G06Q 20/385 |
| 11,036,677 | B1* | 6/2021 | Grunwald | G06F 3/067 |
| 11,044,096 | B2* | 6/2021 | Singi | G06F 21/44 |
| 11,106,458 | B2* | 8/2021 | Adams | G06F 8/70 |
| 11,112,990 | B1* | 9/2021 | Bernat | G06F 3/0617 |
| 11,113,359 | B1* | 9/2021 | Totale | G06F 40/30 |
| 11,209,813 | B2* | 12/2021 | Cella | G05B 19/4185 |
| 2010/0125618 | A1* | 5/2010 | Dutta | G06F 8/10 |
| | | | | 707/822 |
| 2011/0225133 | A1* | 9/2011 | Manu | G06F 16/907 |
| | | | | 707/723 |

(Continued)

*Primary Examiner* — Jeremy S Duffield
*Assistant Examiner* — Hassan A Hussein
(74) *Attorney, Agent, or Firm* — Harness, Dickey & Pierce, P.L.C.

(57) ABSTRACT

Systems and methods are provided for use in authenticating a software artifact, including target applications for a payment network. One exemplary computer-implemented method includes retrieving metadata and a stage log for an artifact from a stage of a pipeline, the metadata including a result of the stage. A keyword count is generated of the stage log, and a checksum for the stage log is generated based on a hashing function. A stage record is compiled for the artifact and the stage. The stage record includes the checksum, a representation of the keyword count, and the result, but not the stage log. The stage record is stored in at least two different data structures. The artifact is authenticated based on the stage records for the artifact in each of the at least two data structures, prior to releasing the artifact into production.

12 Claims, 3 Drawing Sheets

(56) References Cited

U.S. PATENT DOCUMENTS

| | | | |
|---|---|---|---|
| 2013/0152047 A1* | 6/2013 | Moorthi | G06F 11/368 |
| | | | 717/124 |
| 2015/0379072 A1* | 12/2015 | Dirac | G06N 20/00 |
| | | | 707/693 |
| 2016/0019132 A1* | 1/2016 | Vilakkumadathil | |
| | | | G06F 16/2379 |
| | | | 717/126 |
| 2017/0034023 A1* | 2/2017 | Nickolov | H04L 43/0817 |
| 2017/0249462 A1* | 8/2017 | Permeh | G06N 20/00 |
| 2018/0136920 A1* | 5/2018 | Devagupthapu | G06F 8/61 |
| 2019/0065357 A1* | 2/2019 | Brafman | G06F 11/3664 |
| 2019/0163927 A1* | 5/2019 | Kochura | G06F 21/6245 |
| 2019/0207957 A1* | 7/2019 | Espinosa | H04L 9/0637 |
| 2019/0220532 A1* | 7/2019 | Ishizaki | G06F 16/221 |
| 2019/0294536 A1* | 9/2019 | Avisror | G06F 8/433 |
| 2019/0305957 A1* | 10/2019 | Reddy | G06F 8/60 |
| 2020/0012779 A1* | 1/2020 | Chandrasekaran | G06F 21/44 |
| 2020/0057858 A1* | 2/2020 | Sharma | G06N 20/00 |
| 2020/0159421 A1* | 5/2020 | Karumbunathan | G06F 3/0619 |
| 2020/0252219 A1* | 8/2020 | Singi | H04L 9/0637 |
| 2020/0287723 A1* | 9/2020 | Ilany | G06F 21/602 |
| 2020/0374251 A1* | 11/2020 | Warshaw | H04L 51/36 |
| 2020/0387441 A1* | 12/2020 | Bregman | G06F 11/3624 |
| 2021/0110055 A1* | 4/2021 | Miller | H04L 9/088 |
| 2021/0117251 A1* | 4/2021 | Cristofi | G06F 21/577 |
| 2021/0173826 A1* | 6/2021 | Kaza | G06F 16/23 |
| 2021/0248058 A1* | 8/2021 | Hattingh | G06F 9/45558 |
| 2021/0409038 A1* | 12/2021 | Benisty | H03M 13/1177 |
| 2021/0409324 A1* | 12/2021 | Byrne | H04L 43/0823 |

* cited by examiner

SYSTEMS AND METHODS FOR USE IN VALIDATING ARTIFACTS FOR DEPLOYMENT

FIELD

The present disclosure generally relates to systems and methods for use in validating artifacts, based on metadata, hashed data, and/or word counts associated with the artifacts being consistent across multiple data structures.

BACKGROUND

This section provides background information related to the present disclosure which is not necessarily prior art.

Various software development processes are known in which software artifacts are developed, tested and released. Continuous Integration and Continuous Delivery or CI/CD is an automation-based software development and release practice, in which tasks associated with integrating code from multiple developers, compiling the code, testing the compiled code, packaging the code to release an artifact and then ultimately releasing the artifact are subject to automation. In connection therewith, such CI/CD practices require development, testing, and operations teams to work together to create a cohesive release process whereby automation is a key to providing faster release times, reduced risks, and lower costs.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

As artifacts are developed and delivered in a pipeline (e.g., a continuous integration and continuous delivery (CI/CD) pipeline, etc.), the artifacts are subject to code review, code merger, code unit testing, code functional testing, and other suitable testing prior to code deployment. This is done generally through automation, which serves to limit the touch points for tampering. When delay is injected into the pipeline, or human intervention is permitted (or required), however, the potential to disrupt, tamper with or alter the pipeline, or the artifacts generated thereby or test results therefrom, is also possible, whereby a division between development and operation may lead to issues related to the identity of code and testing of that code. For example, a test may be associated with an earlier version of an artifact, or a test result may be altered, whereby the automated CI/CD pipeline provides artifacts that may be insufficiently tested and/or functionally deficient.

Uniquely, the systems and methods herein, in contrast, generate data from metadata and logs associated with the artifacts at each of the (or at different ones of the) stages of the artifacts in the pipeline (e.g., checksums, word clouds, etc.). The data is then distributed to two or more secure data structures, thereby inhibiting manipulation of the artifacts, or data indicative of the stage(s) of the artifacts or results associated therewith. In this manner, artifacts generated through the pipeline, and the multiple different stages thereof, and data indicative thereof (e.g., checksums, test results, test scores, etc.) may be validated at different points between coding and deployment to ensure authenticity of the artifacts at the different stages.

Figure 1:
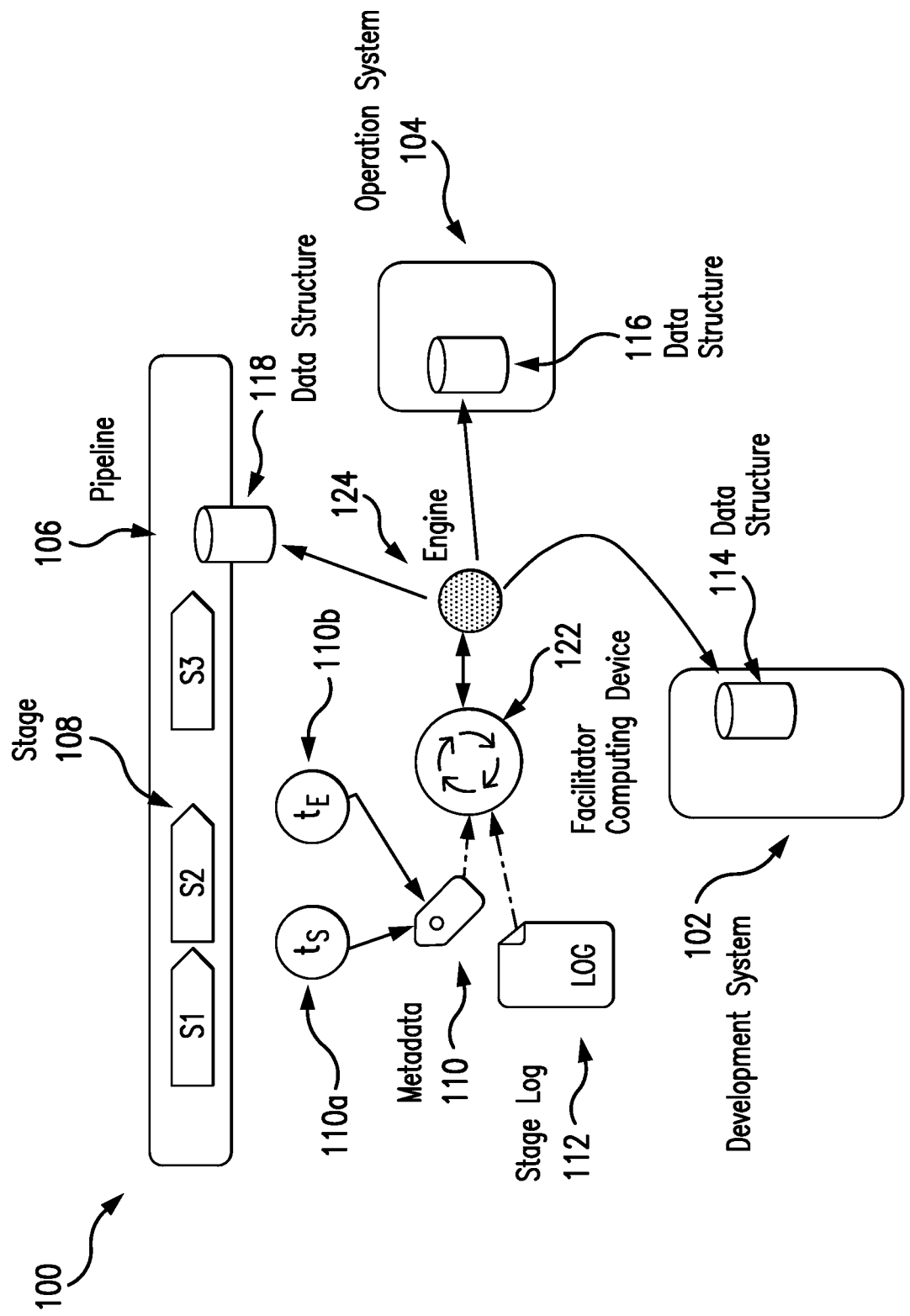
FIG. 1 is an exemplary system that can be used to validate artifacts in an integration and delivery pipeline, through hashed data stored in multiple data structures.

FIG. 1 illustrates an exemplary system 100, in which one or more aspects of the present disclosure may be implemented. Although components of the system 100 are presented in one arrangement, other embodiments may include the same or different components arranged otherwise, depending, for example, on manners of the types and/or features of software artifacts to be tested, the interactions of the artifacts with one or more networks, entity organization and division of responsibilities, etc.

As shown in FIG. 1, the system 100 generally includes a development system 102 and an operations system 104, each associated with the development and deployment of software artifacts. The artifacts may include any type of program, application, application programming interface (API), software development kit (SDK), or other software to be used and/or deployed for the benefit of the systems herein and/or users associated with the systems herein.

In general, the development system 102 is configured to provide development of the artifacts, and the operations system 104 is configured to provide implementation or running of the artifacts. In this exemplary embodiment, a business entity provides one or more solutions to business partners and/or customers through software artifacts. In connection therewith, a software artifact is defined for one or more business reasons and/or relationships and further for a specific technology. When defined, the development system 102 is employed to conceptualize a specification for the artifact, which often includes a list of requirements (e.g., specific behaviors, functions, outputs, formats, etc.), and to develop the software artifact to the specification for the software artifact. When the software artifact is completed, it is delivered to the operations system 104, which is configured to implement the software artifact for use by the business partners and/or customers.

It should be appreciated that the development system 102 and the operations system 104 are configured to interact with one another, although illustrated as separate systems, to facilitate development, testing and delivery of the software artifacts and to ensure that the artifacts are consistent with the specifications of the artifacts (e.g., via one or more network connections, etc.).

The system 100 also includes a development and testing pipeline 106, which defines multiple stages, S1, S2, S3, etc., which are referenced generally at 108. In the illustrated embodiment, the system 100 includes the three stages, S1-S3. In connection therewith, the stages 108 may be generally considered as a compile and build stage (S1), a test stage (S2), and a package and deploy stage (S3). Additionally, while illustrated as separate, the pipeline 106 is defined and/or managed by the development system 102 and the operations system 104, such that the pipeline 106, or parts thereof, may be integrated into the development system 102 and/or the operations system 104.

In this exemplary embodiment, the pipeline 106 includes a continuous integration, continuous delivery (CI-CD) artifact development and release paradigm, which is driven by automation from code integration to release of an artifact. In general, artifacts, given the CI-CD paradigm (and rapid processing associated therewith), are deployed to an artifact repository (e.g., the artifactory product from JFrog Ltd., etc.), or other data structure, and held there subject to the operations herein. In connection therewith, the CI-CD paradigm of the system 100 aids in limiting the human interactions with the artifacts and their test results as the artifacts progress in the pipeline 106.

Specifically, CI provides, among other things, a single version control code repository for all code related to a project with developers directed to implementing changes of a certain size and score. CI involves the integration of code from different developers into the repository, and the compiling, packaging and testing on one or more logical process blocks. In this sense, CI may involve pulling together all of the changes from different developers and other actors making changes for the given project, and then bundling the changes into an artifact to be used in a next phase of the pipeline 106 (e.g., which may include storing the artifact in a retrieval system (such as an artifact repository or a file-system) and/or deploying the artifact into a production system, etc.).

CD then generally follows CI (e.g., as the next phase, etc.), and includes deploying the artifact into production (e.g., picking the artifact from the repository and dropping it into a target production computer system where the software will be started, etc.). In connection therewith, CD involves several checks, such as, for example, whether or not the target system has enough CPU power, has enough free memory space, has enough free storage space, has network connectivity, or has the auxiliary components to make the software package work, etc.; and/or whether or not the target system is up and running (such as webservers, application servers, databases, batch jobs, storages devices, etc.). In this way, CD generally includes automation of the deployment of artifacts through different testing environments (e.g., performance, functionality, etc.) and an automated progression of the code changes through the different environments. CD also provide for any necessary service calls to web servers, databases, and other services that may need to be restarted or that follow other procedures when completed artifacts are deployed.

Together, the CI and CD phases are generally referred to herein as the pipeline 106, where the CI phase generally includes the stages S1 (compile and build) and S2 (test), and the CD phase generally includes the stage S3 (package and deploy). In connection therewith, the CI and CD phases are often triggered/coordinated by orchestration software such as Jenkins, Concourse, etc. Theoretically, CI and CD follow in generally rapid succession (as described above), such that as soon as changes to the software are bundled into the artifact (in the CI phrase), the artifact is immediately deployed into production (in the CD phase).

However, some complex software may not be deployed into production immediately after bundling changes to the software into the artifact in the CI phrase for a variety of reasons. For example, multiple teams may be building different parts or aspects of the complex software, with each team having multiple developers. As such, a CI process may trigger each time a developer of a first team makes a change to a part or aspect of the complex software, and result in bundling the various parts or aspects of the software into an artifact, including the changed parts or aspects and the unchanged parts or aspects. The artifact, however, may be too immature (i.e., not ready) to be deployed into production in CD due, for example, to the need for other teams or developers to contribute other changes. Consequently, the various part or aspects of the complex software awaiting changes, as well as the part or aspect to which the change(s) has/have been made by the first team, may be bundled into an artifact that is instead stored as a snapshot (e.g., in an artifact repository or file-system, etc.).

When all the developers of all of the teams have sufficiently contributed changes to the various parts or aspects of the complex software, and all of the changes from all of the developers are bundled into an artifact, the artifact may be considered mature for production and thus, ready to deploy in the CD phase. However, as can be appreciated there may be a significant delay (e.g., days, weeks, months, etc.) between the time that the developer of the first team makes a change to a part or aspect of the complex software (resulting in the artifact being stored as a snapshot), as described above, and the time at which all of the changes from all of the developers are completed (where the artifact is then ready for deployment). During this delay, there are risks that the artifact may be corrupted or impermissibly altered.

For example, delays may exist between the bundling of the changes into the artifact and the actual deployment of the bundled artifact in CD, especially in the case of deploying complex software to production environments. In some instances, the delay may be mandated by external restrictions, such as a compliance body, in order for the compliance body to inspect the bundled artifact manually. This may take hours, if not days, to complete, which is theoretically inconsistent with the general rapidly successive nature of the CI-CD paradigm. During this delay, while the bundled artifact is waiting for deployment in CD, risks exist that the bundled artifact may be corrupted by humans or other actors. For instance, an administrator of an artifact repository to which the bundled artifact has been stored, may replace the bundled artifact with a similar artifact that has been altered in a material way (e.g., injected with a virus, etc.). Or, an administrator of a test stage associated with testing an artifact may manipulate the results of the test, for example, up-marking a test pass score from 30% to 100%, etc.

That said, while the snapshots may be deployed into a non-serious environment (e.g., a non-production environment, etc.), for example, for testing purposes prior to deployment to a production environment, it should be appreciated some may still be considered mature enough to be actually placed into production. Additionally, in some instances, delay between the CI and CD phases may be mandated by external restrictions, to allow time to inspect a package manually before deployment (e.g., hours, days, etc.) (independent of the complexity of the software).

In any case, aspects of the present disclosure are directed to making corruption to the artifact(s)) evident.

In connection therewith, the stages 108 of the pipeline 106 (i.e., of the CI-CD paradigm) are scripted and generally include the compile and build stage (S1), the test stage (S2), and the package and deploy stage (S3) in the illustrated embodiment. That said, the stages 108 may alternatively include, without limitation, code review, code merge, code build, code unit test, code coverage test, code quality static test, code functional test, code vulnerability test, code performance test, code deploy test, etc. It should be appreciated that other stages may be included in other pipelines in other system embodiments (e.g., such that the pipeline includes more than three stages, etc.). What's more, as part of the pipeline 106, at each stage 108, the artifact may either pass or fail, and when it passes, the artifact subject to the stage is advanced toward the next stage 108 and/or on to deployment. As the artifact progresses from stage to stage, the pipeline 106 is configured to generate and/or record metadata 110 and a stage log 112 for the artifact on a generally stage-by-stage basis.

As described in greater detail below the example metadata 110 for each stage 108 generally includes a name for the artifact and one or more times that the artifact is subject to the stage 108. The name of each artifact in the pipeline 106 of the example system 100, as included in the example metadata 110, is generally unique and determined at the first stage, for example, the compile and build stage (S1), etc. (e.g., as the artifact is introduced into the pipeline 106, etc.). For instance, an example artifact name may include ABC-APP-Snapshot-ver-1.2.3456, etc. The one or more times that the artifact is subject to the given stage 108, as included in the example metadata 110 for each stage 108, generally include a time range and, in particular, a start time ($t_S$) 110a and an end time ($t_E$) 110b that the artifact is subject to the stage 108. The times may be represented in epoch (or Unix time stamps) (e.g., 23232442 and 23232898, etc.) or one or more representations of time (e.g., 06-20-YY@14:23:54 and 06-20-YY@18:23:12, etc.).

In one or more embodiments, the metadata 110 may include more, less, or different data associated with, or specific to, the artifact and/or the stage 108 such as, for example, a name for the stage 108 (e.g., unit test, etc.), a size for the artifact (e.g., a byte size (e.g., 26,472,448 bytes, etc.), etc.), an identification of a driver framework (e.g., junit, etc.) for the stage 108 (e.g., a test stage, etc.), a version (e.g., 2.3, etc.) of the driver framework, a result of the stage 108 (e.g., pass/fail and/or test scores, etc.) (e.g., as included in a standard-out message of the stage log 112, etc.), a cyclical redundancy check (CRC) value for the artifact, an identification of (or an association with) the stage log 112 for the artifact subject to the stage 108, and/or attributes associated with the stage log 112 for the stage 108 to which the artifact is subjected (e.g., a framework associated with the stage log 112 (e.g., junit and/or Java Virtual Machine HotSpot, etc.), a version of the framework (e.g., version 8.1 for junit, etc.), etc.), etc.

The pipeline 106 is configured to generate a different stage log 112 for each stage 108 to which the artifact is subjected. In the example system 100, the pipeline 106 is configured to generate each stage log 112 when the artifact is exposed to the corresponding stage 108. The particular data in the stage log 112 may vary depending on the particular stage 108 for which the stage log 112 is generated. However, the stage log 112 may generally include detail logs (or data) (e.g., in generally line-by-line fashion, etc.) for the artifact for the particular stage 108 (e.g., messages, warnings, and/or errors; actors (e.g., persons, etc.) that were involved in (e.g., triggered, etc.) the stage 108; results of processes executed for the stage 108; and/or time spent executing processes of the stage 108.

For instance, for the compile and build stage (S1), the stage log 112 may include a build log, such that the stage log 112 generated by the pipeline 106 (broadly, a build log 112) is specific to the compile and build stage (S1). The example build log 112 for the compile and build stage (S1) may include a variety of messages/or results. For instance, the build log 112 may include build/compile messages generated by the S1 stage, recorded in a line by line fashion (e.g., errors, warnings, suggestions, libraries used for compiling, etc.) and/or a person/trigger that started the build/compilation, etc. As another example, for the test stage (S2), the stage log 112 may include a test log, such that the stage log 112 generated by the pipeline 106 (broadly, a test log 112) is specific to the test stage (S2). The example test log 112 for the test stage (S2) may also include a variety of messages and/or results. For instance, the test log 112 may include a number and/or identification of the tests executed by the S2 stage for the artifact, a time spent executing the tests, and/or results for the tests executed for the artifact at the S2 stage (e.g., pass/fail and/or test scores; etc.) (e.g., a specific standard-out message sent to a standard output, etc.) (e.g., again, recorded in a line by line fashion; etc.).

In view of the above, it should be appreciated that the metadata 110 for a given artifact is unique to the artifact for each of the states of the pipeline 106 to which the artifact is subject, notwithstanding the fact that the format of the metadata 110 for a particular stage 108 may be general to the stage 108 and non-specific to the artifact.

It should also be appreciated that the contents of the stage log 112 generated for a particular artifact subject to a particular stage 108 (and included in the metadata 110 for the particular artifact subject to the particular stage 108) should generally be identical each and every time that particular stage 108 is executed in the pipeline 106 for that particular artifact. More particularly, in the example system 100, the stage log 112 for an a particular artifact subject to a particular stage 108 should generally include an identical textual log each time a particular artifact is subject to that particular stage 108. However, when activity of the particular stage 108 is tampered with, the stage log 112 for the particular artifact may vary even when the particular artifact is subject to the same stage 108.

The pipeline 106 is further configured, at the end of each of one or more of the stages 108 (e.g., S1, S2, and/or S3, etc.) or later, to store the metadata 110 and stage log 112 (as described above) for the stage 108 (e.g., including the unique name for the artifact, etc.) in memory associated with the pipeline 106 (e.g., in data structure 118 of the pipeline 106, etc.). And, when the stages 108 of the pipeline 106 are complete, the pipeline 106 may be configured to tag the artifact as deployment ready, or otherwise, and to deploy the artifact to the artifact repository or other data structure (e.g., as a snapshot, etc.) to await validation and authentication prior to finally being pushed (or deployed) into production, as described in more detail below.

Figure 2:
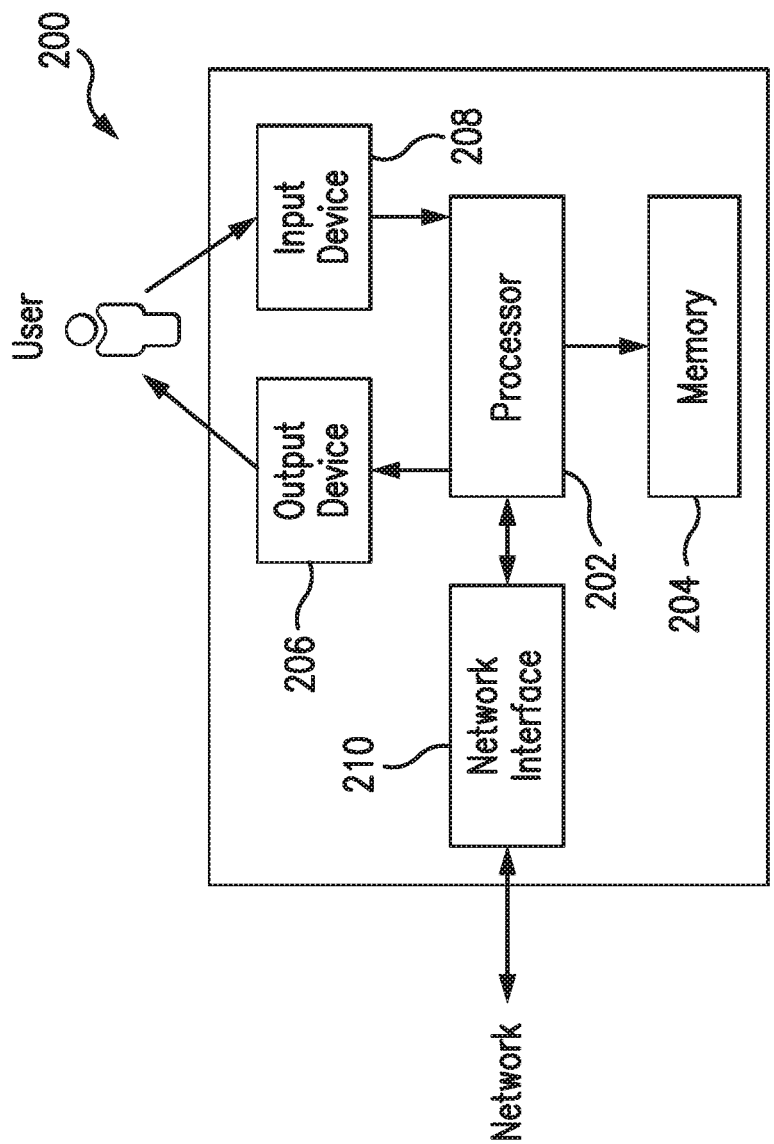
FIG. 2 is a block diagram of an exemplary computing device, suitable for use in the exemplary system of FIG. 1.

FIG. 2 illustrates an exemplary computing device 200. In the exemplary embodiment of FIG. 1, each of the development system 102 and the operations system 104 of the system 100 is implemented in at least one computing device consistent with computing device 200. In connection therewith, the computing device 200 may include, for example, one or more servers, personal computers, laptops, tablets, PDAs, telephones (e.g., cellular phones, smartphones, other phones, etc.), etc., as appropriate. The system 100, and its components, however, should not be considered to be limited to the computing device 200, as described below, as different computing devices and/or arrangements of computing devices may be used. In addition, different components and/or arrangements of components may be used in other computing devices. Further, in various exemplary embodiments the computing device 200 may include multiple computing devices located in close proximity, or distributed over a geographic region. Additionally, each computing device 200 may be coupled to a network (e.g., the Internet, an intranet, a private or public LAN, WAN, mobile network, telecommunication networks, combinations thereof, or other suitable networks, etc.), for example, to allow for communication with other devices, etc.

The exemplary computing device 200 includes a processor 202 and a memory 204 that is coupled to the processor 202. The processor 202 may include, without limitation, one or more processing units (e.g., in a multi-core configuration, etc.), including a general purpose central processing unit (CPU), a microcontroller, a reduced instruction set computer (RISC) processor, an application specific integrated circuit (ASIC), a programmable logic device (PLD), a gate array, and/or any other circuit or processor capable of the functions described herein. The above examples are exemplary only, and thus are not intended to limit in any way the definition and/or meaning of processor.

The memory 204, as described herein, is one or more devices that enable information, such as executable instructions and/or other data, to be stored and retrieved. The memory 204 may include one or more computer-readable media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, flash drives, hard disks, and/or any other type of volatile or nonvolatile physical or tangible computer-readable media. The memory 204 may be configured to store, without limitation, artifacts, metadata, stage logs, word clouds, hash values (e.g., checksums, etc.), test results, stage records, and other types of data (and/or data structures) suitable for use as described herein, etc. Furthermore, in various embodiments, computer-executable instructions may be stored in the memory 204 for execution by the processor 202 to cause the processor 202 to perform one or more of the functions described herein (e.g., one or more of the operations of method 300, etc.), such that the memory 204 is a physical, tangible, and non-transitory computer-readable media. In this manner, such instructions may effectively transform the computing device 200 into a special purpose device. It should be appreciated that the memory 204 may include a variety of different memories, each implemented in one or more of the functions or processes described herein.

In the exemplary embodiment, the computing device 200 includes an output device 206 that is coupled to the processor 202 (however, it should be appreciated that the computing device 200 could include other output devices, etc. in other embodiments). The output device 206 outputs, to a user (e.g., a test engineer, a developer, or other person, etc.), by, for example, displaying authentication outputs for artifacts and/or any other type of data. And, in some cases, the computing device 200 may cause interfaces associated with the artifacts, for example, to be displayed at the output device 206 of another computing device, including, for example, the development system 102 or the operations system 104, etc. Output device 206 may include, without limitation, a cathode ray tube (CRT), a liquid crystal display (LCD), a light-emitting diode (LED) display, an organic LED (OLED) display, and/or an "electronic ink" display. In some embodiments, output device 206 includes multiple devices.

The computing device 200 also includes an input device 208 that receives input from the user of the computing device 200, such as selections of artifacts for deployment, etc. The input device 208 is coupled to the processor 202 and may include, for example, a keyboard, a pointing device, a mouse, a stylus, a touch sensitive panel (e.g., a touch pad or a touch screen, etc.), another computing device, and/or an audio input device. Further, in various exemplary embodiments, a touch screen, such as that included in a tablet, a smartphone, or similar device, behaves as both output device 206 and input device 208.

In addition, the illustrated computing device 200 also includes a network interface 210 coupled to the processor 202 and the memory 204. The network interface 210 may include, without limitation, a wired network adapter, a wireless network adapter, a mobile telecommunications adapter, or other device capable of communicating to one or more different networks. In some exemplary embodiments, the computing device 200 includes the processor 202 and one or more network interfaces incorporated into or with the processor 202.

Referring again to FIG. 1, the system 100 includes three data structures 114, 116, and 118. The first data structure 114 is associated with and/or included in the development system 102 (e.g., in memory 204 thereof, etc.), and the second data structure 116 is associated with and/or included in the operations system 104 (e.g., in memory 204 thereof, etc.). The third data structure 118 is associated with and/or integrated with the pipeline 106 (e.g., in memory 204 thereof, etc.). In connection therewith, the data structures 114-118 may generally be stored in the memory (of the respective development system 102, operations system 104, and pipeline 106, etc.).

More particularly, the example data structures 114-118 each include a document database (in contrast to a traditional relational database management system (RDBMS) database where data is stored across multiples tables having a row and column format). As described in greater detail below, the metadata 110 generated and/or recorded by the pipeline 106 and data representative of the stage logs 112 is generated and/or recorded by the pipeline 106 stored in (or, triplicated across) document database data structures 114-118, where the elements of the metadata 110 and elements representative of the stage logs 112 (e.g., the name, times, word counts, word clouds, hash values, etc.) are each stored as key-value pairs in the document database data structures 114-118, such that the document database data structures 114-118 serve as storage for a "system of records" for the pipeline 106. In connection therewith, it should be understood that each of the data structures 114-118 provides limited access, whereby each of the data structures 114-118 is generally read only, except for write access granted to a secure write engine 124 included in the system 100 for certain ones of the data structures 114-118 (which is described in more detail hereinafter). Further, in one or more embodiments, ownership (or management) of the data structure 118 may be with an administrator that cannot be an administrator of either of the data structures 116 and 114.

In this exemplary embodiment, in order to avoid or limit (or at least detect) tampering with the artifact (in the artifact repository), the system 100 includes a facilitator computing device 122, which is separate from the pipeline 106 and/or wholly or partially included therein. The facilitator computing device 122 is configured, by executable instructions, to perform the operations described herein. As described in more detail below, such operations generally include, but are not limited to, retrieving the metadata 110 and a stage log 112 generated by the pipeline 106 when an artifact is subject to the corresponding stage 108, generating a stage record based on the metadata 110 and stage log 112, writing the stage record to data structure 118, providing the stage record to the secure write engine 124 for triplication across data structures 114 and 116, and authenticating the artifact based on the stage records from data structures 114-118 prior to releasing the artifact into production.

The facilitator computing device 122 is generally consistent in structure with the computing device 200 described above. In addition, the secure write engine 124 of the system 100 is separate and independent from the development system 102, the operations system 104, and the pipeline 106 and is configured, by executable instructions, to communicate with the facilitator computing device 122 and one or more of data structures 114-118 and to perform the operations described herein (e.g., via one or more networks, etc.). The secure write engine 124 is also generally consistent in structure with the computing device 200 described above. That said, the secure write engine 124 may have only read access to the data structure 118, but may have write access to the data structures 114 and 116. Further, the data stored in the data structure 118 and, in particular, the stage records generated by the facilitator computing device 122 and stored in the data structure 118, may be duplicated into one of the data structures 114 and 118 or triplicated into both of the data structures 114 and 116 by the secure write engine 124, for example, as the data is stored in the data structure 118 following completion of a stage (or thereafter).

As one of the steps in the CD phase, the facilitator computing device 122 may be configured to compare data and, in particular, the stage records, of the data structures 114-118 for analyzing for tamper evidence. Any mismatch between the data in the stage records of the three data structures 114-118, for a particular artifact name, for example, may indicate that the artifact has been tampered with.

In connection therewith, the facilitator computing device 122 is configured to capture, retrieve, etc. the metadata 110 for a given stage 108 and artifact subject to the stage 108 (e.g., from the stage 108 of the pipeline 106), as generated by the pipeline 106. The facilitator computing device 122 is also configured to capture, retrieve, etc. the stage log 112 (or data therein) for the given stage 108 and artifact (e.g., from the stage 108 of the pipeline 106). Consistent with the above, the captured metadata 110 and stage log 112 may include any of the data described above (e.g., the unique name for the artifact, a start time ($t_S$) and an end time ($t_E$) that the artifact is subject to the stage 108, the stage log 112 (e.g., a build log 112, a test log 112, etc.), a stage result (e.g., test results (e.g., as included in a standard-out message in the stage log 112, etc.), etc.) (broadly, stage data). The facilitator computing device 122 is configured to then process the captured stage data to generate a particular stage record based on the captured metadata 110 and stage log 112, yet include additional data (e.g., a word cloud and hash value, etc.) generated by the facilitator computing device 122 as described below.

More specifically, in connection with processing the data, the facilitator computing device 122 may be configured to generate a keyword count index from the stage log 112 and to create a representation of the count for the number of occurrences of particular keywords included in the stage log 112 (e.g., excluding common words, etc.). In this exemplary embodiment, the facilitator computing device 122 may be configured to only include keywords from a listing of keywords in the index with the associated counts, or alternatively, the facilitator computing device 122 may include all words from the stage log 112 in the index, unless a word is included in a stop list or black list of words to exclude (e.g., common words of the stage log 112 (e.g., prepositions, such as "the", "of", etc.), etc.). Established algorithms may be used in connection with generating the keyword count index. Table 1 illustrates an exemplary count index that may be compiled for a segment of a stage log 112.

TABLE 1

| Keyword | Count |
| --- | --- |
| Compile | 230 |
| Warning | 110 |
| Error | 103 |
| Failed | 102 |
| Passed | 92 |
| Success | 58 |
| ... | ... |

When the keyword count index is generated, the facilitator computing device 122 may be configured to then generate a word cloud based on the count index. Established algorithms may be used in connection with generating the word cloud (e.g., as available with Apache Lucern StandardTokenizer, etc.).

The facilitator computing device 122 may be further configured to apply a hashing algorithm to the stage log 112 to generate a hash value. The hashing algorithm may include, for example, a secure hash algorithm (e.g., SHA-256, etc.) or a checksum algorithm (e.g., a cyclical redundancy check (CRC) algorithm, etc.) For example, the facilitator computing device 122 may be configured to generate a checksum of the stage log 112, by performing a SHA-256 hash or other suitable hashing function on the stage log 112.

When the data is processed and the word count (potentially, represented by the word cloud) and hash value (e.g., the checksum) are generated, the facilitator computing device 122 is configured to compile a stage record (e.g., in the form of a JSON document, etc.) for the given stage 108 and artifact subject to the stage 108 based on the metadata 110, the stage log 112 captured from the pipeline 106, and the word count and hash value generated by the facilitator computing device 122. More particularly, the example stage record may include a variety of data elements in the form of key-value pairs including captured metadata 110, the word count, and the hash value. It should be appreciated that by including the word count and hash value, the facilitator computing device 122 is configured to obviate the need to persist the stage log 112 itself which may be significant in size. An example of key-value pairs included in a stage record generated by the facilitator computing device 122 is illustrated in Table 2 below.

TABLE 2

| Key | Value |
| --- | --- |
| stage_name | unit test |
| stage_start_time | 23232442 |
| stage_end_time | 23232898 |
| artifact_name | app-abc-ver-1.2.3.snapshot |
| artifact_CRC | 0x645661B3 |
| artifact_bytesize | 26,472,448 |
| stage_meta_data | {driver = junit}, {driver_version = 2.3} |
| stage_log | Starting .../nJunit version 8.1/nJava JVM HotSpot version ... |
| stage_word_cloud | Oracle, Hotspot, success, ... |
| stage_log_hash | a94a8fe5ccb19ba61c4c0873d391e987982fbbd3 |
| stage_word_count | 678 |

As illustrated above, the example stage record includes a key for the name of the stage 108 to which the artifact is subjected (i.e., stage_name) and the name of the stage (i.e., unit test), as derived from the captured metadata 110, as the value. The stage record further includes a key for the start time ($t_S$) and the end time ($t_E$) that the artifact is subject to the stage 108 (i.e., stage_start_time and stage_end_time) and the corresponding times in epoch (i.e., 23232442 and 23232898), as the respective values. The stage record also includes a key for the name for the artifact (e.g., artifact_name, etc.), a key for the CRC value for the artifact (i.e., artifact_CRC), a key for the size of the artifact (i.e., artifact_bytesize), a key for an identification of a driver framework for the stage 108 and the version of the driver framework (i.e., stage_meta_data), and a key for attributes associated with the stage log 112 generated by the pipeline 106 for the stage 108 to which the artifact is subjected as a key (i.e., stage_log), where each key is associated with its respective values. These values are again generally derived from the metadata 110 captured by the facilitator computing device 122.

The stage record also includes a key for an indication of whether the word cloud generation was successful (i.e., stage_word_cloud) and the corresponding value (e.g., "success," etc.), in addition to a key for the count for keywords included in the stage log 112 (i.e., stage_word_count), as created by the facilitator computing device 122, and the corresponding count (e.g., excluding common words, etc.). In connection therewith, it should again be appreciated that in one or more embodiments the word count may be represented as the word cloud (or word cloud token) generated by the facilitator computing device 122 based on the stage log 112. The stage record further includes a key for the hash value of the stage log 112 generated by the facilitator computing device 122 (i.e., stage_log_hash), with the corresponding hash value.

The facilitator computing device 122 is then configured to write the stage record to the data structure 118 (e.g., as a system of record, etc.), and also pass the stage record to the secure write engine 124 (or, potentially, make the stage record available for retrieval by the write engine 124). The secure write engine 124, in turn, is configured to receive the stage record and write (or triplicate) the stage record to each of the data structures 114 and 116, where administrators of data structures 114 and 116 (e.g., administrators on the development team and administrators on the operations team, respectively, may have only read access to data structures 114 and 116, such that the stage record is stored as "immutable" data for the respective administrators).

Thereafter, when it is decided to advance the artifact, the facilitator computing device 122 is configured to pull, retrieve, etc. the stage records from the different data structures 114-118 (or at least a portion thereof) (as permitted as a read only operation) and to authenticate the artifact based on the stage records. In connection therewith, the facilitator computing device 122 is configured to compare the stage records, for example, the value(s) for one or more keys for the metadata 110, the value for the hash value key (e.g., the CRC value for the stage log 112, etc.) and/or the value for the word count key (e.g., the count for keywords included in the stage log 112 (e.g., potentially represented by the word cloud, etc.), etc.), for each of the stage records from the different data structures 114-118. When the stage records are validated against one another (e.g., based on a match of the metadata 110, the hash value, and/or the word count in stage records from each of the database 114-118, etc.), the facilitator computing device 122 is configured to authenticate the artifact for advancement in the pipeline 106 or for delivery.

Figure 3:
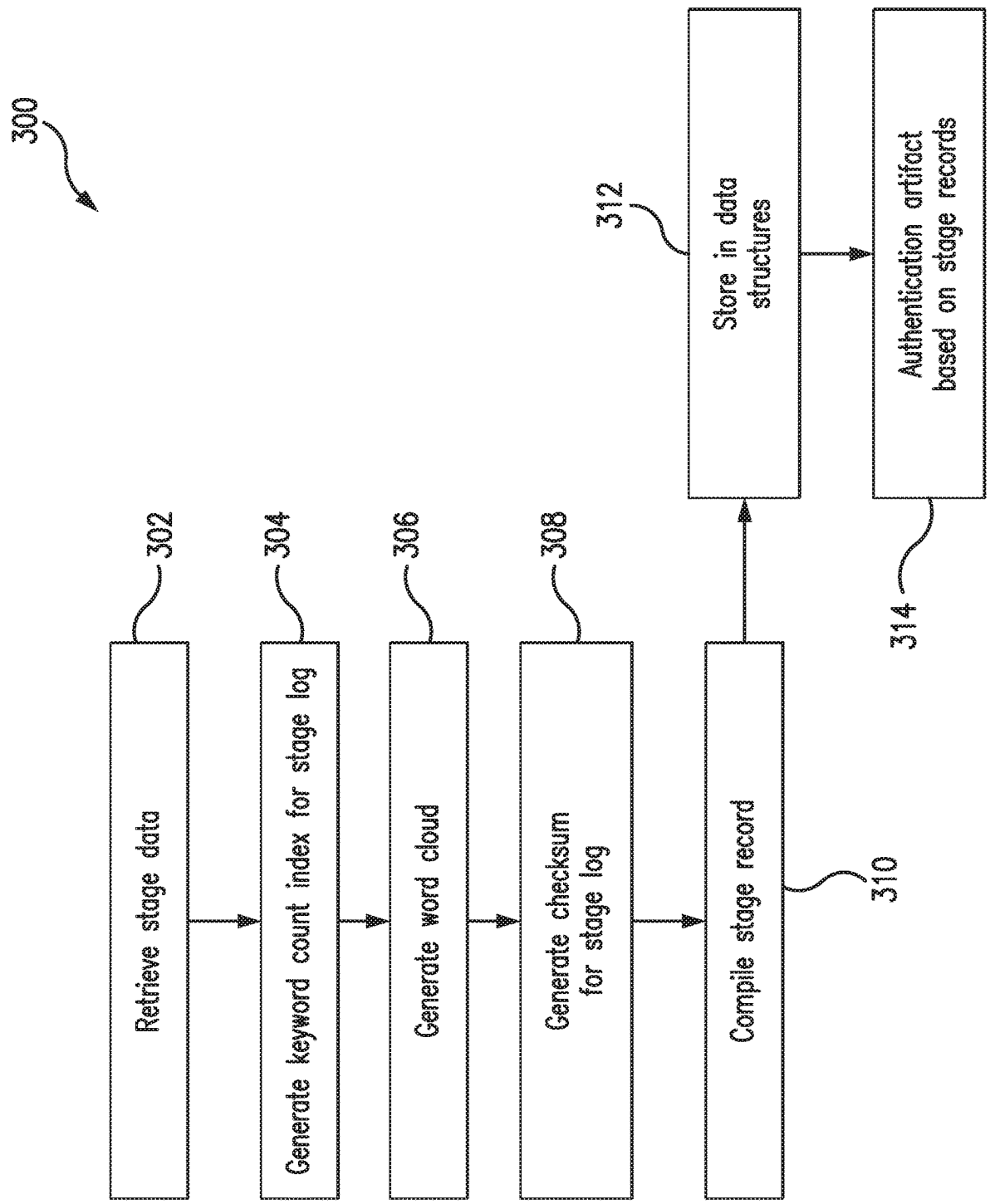
FIG. 3 is an exemplary method for use in validating artifacts in an integration and delivery pipeline, through metadata, hashed data, and/or word counts stored in multiple data structures, which may be implemented in the exemplary system of FIG. 1.

FIG. 3 illustrates an exemplary method 300 for use in validating software artifacts in a pipeline, through data included in stage records stored in multiple data structures. The method 300 is described with reference to the pipeline 106 and the stages 108 thereof, the facilitator computing device 122, and the secure write engine 124 of the system 100, as well as with reference to the computing device 200. It should not be understood, however, that the method 300 (or other methods described herein) is/are not limited to the system 100 or to the computing device 200. Likewise, the systems and computing devices herein should not be understood to be limited to the method 300.

Further in the method 300, an exemplary artifact A1 is deployed into the artifact repository in connection with the pipeline 106, which includes the multiple stages 108. The artifact A1 is awaiting testing and final deployment into products. That said, another different artifact may be held in the artifact repository in connection with the pipeline 106, between the stages 108, whereby the method 300 may also be applied before advancing the different artifact to a next stage 108 in the pipeline 106.

With regard to artifact A1, upon completion of a stage 108 in the pipeline 106, the facilitator computing device 122 retrieves, at 302, the stage data for the stage 108 and for the artifact A1 from the pipeline 106 (e.g., from the stage 108 of the pipeline 106). Consistent with the above description in relation to FIG. 1, the stage data includes the example metadata 110 generated by the pipeline 106 (as described above) for the stage 108 and the artifact A1 subject to the stage 108. The stage data also includes the stage log 112 generated by the pipeline 106. As generally described above, the content of the stage log 112 generally depends on the stage that generates the log. For instance, the compile and build stage (S1) will generally have a different log than the test stage (S2), etc. However, regardless of the stage, at least part of the stage log 112 includes human-readable ASCII data.

At 304 through 308, the facilitator computing device 122 processes the stage log 112 and generates additional metadata based on the stage log 112 where necessary, etc. (e.g., the word count (potentially as represented by a word cloud) and/or a hash value of the stage log 112, etc.), consistent with the description above in relation to FIG. 1.

In connection with processing the stage log, the facilitator computing device 122 generates, at 304, a keyword count index for the retrieved stage data, which includes a count for the number of occurrences of particular keywords in the stage log 112 (e.g., as shown in Table 1 above, etc.), consistent with the above. In this exemplary embodiment, the facilitator computing device 122 may only include keywords from a listing of keywords in the index with the associated counts, or alternatively, the facilitator computing device 122 may include all words from the stage log 112 in the index, unless a word is included in a stop list or black list of words to exclude (e.g., common words of the stage log 112 (e.g., prepositions, such as "the", "of", etc.), etc.). In connection therewith, the facilitator computing device 122 may, for example, break the text up into distinct elements such as words and sentences (e.g., tokenize the text where the different elements (e.g., the words, sentences, etc.) that constitute the text are called tokens; etc.). As an illustrative example, the text "Error in artifact at run routine in line 39" may be tokenized into the following tokens: [error], [in], [artifact], [at], [run], [routine], [in], [line], and [39]. Similarly, the text that includes a particular file path "C:\Apps\transact\account.exe" may be tokenized into the tokens: [C:], [C:/Apps], [C:/Apps/transact], and [C:/Apps/transact/account.exe]. In turn, a key word count index of the token data for the analyzed text is determined (based on a tally of the tokens with each of their occurrences). For the first example above, the words "error," "artifact," "at," "run," "routine," and "39" will have counts of one each, while the word "in" will have two counts (however, the word "in" may be filtered in one or more embodiments). The grand sum of each token occurrence is stored in the data structure 118.

At 306, the facilitator computing device 122 generates a word cloud based on the count index (e.g., from the high occurrence data in Table 1, etc.), consistent with the above, where each keyword is included in the word cloud and sized based on the number of occurrences of the keyword in the stage log 112. And, at 308, the facilitator computing device 122 generates a checksum for the stage log 112, also consistent with the above. The checksum may be generated based on an SHA-256 hash function, or other suitable function (e.g., MD5 function, etc.), whereby the checksum is specific to the stage log 112.

With that said, at 310, the facilitator computing device 122 compiles a stage record for the stage 108 consistent with the above explanation in relation to FIG. 1. In this exemplary embodiment, the stage record includes the metadata 110 described above in relation to FIG. 1 and Table 1 (e.g., the unique name of the artifact A1 for the stage 108, the start and end times of the stage 108, a stage result (e.g., pass/fail results, test scores, etc.), etc.). The stage record also includes the word cloud and the SHA-256 hash of the stage log 112. It should be appreciated that other data may be included in the stage record, but the stage record will, in general, not include the stage log 112. Because of the large amount of data included in the stage log 112, storing the stage log 112 as received may be prohibitive with regard to computing capacity and undesired with regard to real time decision making. As such, the immutable data from the detailed stage log 112, in the form of the hash value and/or word count (or word cloud), is generated and used herein. That said, the entire log 112 itself may still be stored (e.g., by the pipeline 106 in data structure 118, etc.), for example, for use in connection with an audit-trail, or postmortem analysis, etc. (e.g., as a portion of tamper evidence, etc.).

At 312, the stage record is then stored by the facilitator computing device 122 in the data structure 118. The stage record is also provided, at 312, to the secure write engine 124, whereby the secure write engine 124 stores, at 312, the stage record, in this embodiment, to each of data structures 114 and 116, thereby triplicated the stage record (as the secure write engine 124 has only read access to the data structure 118 but is uniquely permitted to write to the data structures 114 and 116). That is, in this exemplary embodiment, the development system 102 is not enabled to edit the data structure 114, and the operations system 104 is not enabled to edit the data structure 116, thereby securing the stage records written/triplicated thereto.

While the artifact is maintained in the artifact repository, the stage records are maintained and unaltered in the data structures 114 and 116, as well as data structure 118 to the extent that the stage record has not been altered in data structure 118. When the artifact A1 is moved from the artifact repository into a next or further stage in the pipeline 106 (e.g., to delivery, etc.) or to production (e.g., based on a go/no go decision or approval by stakeholders involved with the advancing the artifact A1, etc.), the facilitator computing device 122 pulls the artifact name for the artifact A1 and retrieves the stage records from each of the data structures 114-118. The facilitator computing device 122 then authenticates, at 314, the artifact based on the stage records (as determined or identified by its unique name). In particular, the facilitator computing device 122 compares the stage records, and in particular, the metadata (e.g., stage results (e.g., test results, etc.), etc.)), the word count (or word cloud) generated for the stage log 112, and/or the checksum for the stage log 112 included in the different stage records. Any mismatch between the stage records from these data structures 114-118, for example, for a particular artifact name, may indicate that the artifact has been tampered with, whereby the facilitator computing device 122 may flag the artifact as "tampered". When they match, the facilitator computing device 122 confirms the artifact A1 and the results included in the stage record as being authentic, thereby permitting the artifact A1 to be advanced in the pipeline 106 and/or to delivery (and may also flag the artifact as "not tampered").

In view of the above, the systems and methods herein provide a mechanism for authenticating artifacts and stage results in a pipeline, to inhibit tampering with the artifact or the stage results for the artifact.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following steps: (a) retrieving metadata and a stage log for an artifact from a stage of a pipeline, the metadata including a result of the stage; (b) generating a keyword count of the stage log; (c) generating a checksum for the stage log, based on a hashing function; (d) compiling a stage record for the artifact and the stage, the stage record including the checksum, a representation of the keyword count, and the result, but not the stage log; (e) storing the stage record in at least two different data structure; and (f) authenticating the artifact based on the stage records for the artifact in each of the at least two data structure, prior to releasing the artifact into production.

Likewise, a system and/or a computing device may include at least one processor configured to perform one or more of the methods described and/or claimed below, and include a memory in which test scripts, outputs, observations, application monitors, etc. are stored.

With that said, exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

As used herein, the term "and/or" and the term "at least one of" includes any and all combinations of one or more of the associated listed items.

Although the terms first, second, third, etc. may be used herein to describe various elements and operations, these elements and operations should not be limited by these terms. These terms may be only used to distinguish one element or operation from another element or operation. Terms such as "first," "second," and other numerical terms when used herein do not imply a sequence or order unless clearly indicated by the context. Thus, a first element operation could be termed a second element or operation without departing from the teachings of the exemplary embodiments.

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in authenticating a software artifact, the method comprising:
   retrieving, for a first stage of a pipeline, metadata for an artifact and a log for the artifact, the metadata including a unique name of the first stage, a size of the artifact, and a result of the first stage, the log including line-by-line messages generated by the first stage;
   generating, by a computing device, a keyword count for the log;
   generating, by the computing device, a checksum for the log, by applying a hashing function to the log, the checksum including a value unique to the log;
   compiling, by the computing device, a first stage record for the artifact and the first stage, the first stage record including the checksum, a representation of the keyword count, and the metadata, but not the log;
   storing the first stage record in a first data structure located in a first computing device and duplicating the first stage record in a second data structure located in a second computing device, which is distinct from the first computing device; and
   authenticating the artifact based on the first stage record for the artifact in each of the first and second data structures, prior to releasing the artifact from the first stage of the pipeline into production, wherein authenticating the artifact includes comparing the checksum in the first stage record from the first data structure to the checksum in the first stage record from the second data structure.

2. The computer-implement method of claim 1, wherein the metadata further includes a start time of the first stage and an end time of the first stage.

3. The computer-implement method of claim 1, wherein the first computing device is integrated into a development system and the second computing device is integrated into an operations system.

4. The computer-implemented method of claim 1, further comprising duplicating the first stage record to a third data structure included in a pipeline distinct from the first and second computing devices.

5. The computer-implement method of claim 1, wherein authenticating the artifact further includes:
   comparing the result in the first stage record from the first data structure to the result in the first stage record from the second data structure; and
   authenticating the artifact when the checksums and the results match.

6. A system for use in authenticating a software artifact, the system comprising:
   a facilitator computing device and a secure write computing device, wherein the facilitator computing device is configured to:
      for each one of multiple stages of a pipeline:
         retrieve metadata for an artifact and a log for the artifact, the metadata including a unique name of the stage, a size of the artifact, and a result of the stage, the log including line-by-line messages generated by the stage;
         generate a keyword count of the log;
         perform a hashing function on the log to generate a hash value, the hash value representative of the log;
         compile a stage record for the artifact and the stage, the stage record including the hash value, a representation of the keyword count, and the metadata;
         store the stage record in a first data structure in a first computing device; and
         pass the stage record to the secure write computing device; and,
   wherein the secure write computing device is configured to store each of the stage records in a second data structure of a second computing device, which is distinct from the first computing device and the facilitator computing device, the second data structure being different than the first data structure; and
   wherein the facilitator computing device is further configured to authenticate the artifact for a first one of the multiple stages of the pipeline, based on the stage record for the first one of the multiple stages, the artifact stored in the first and second data structures;
   wherein the facilitator computing device is configured to, in connection with authenticating the artifact, compare the hash values in the stage record for the first one of the multiple stages stored in the first and second data structures.

7. The system of claim 6, wherein the metadata includes a start time of the stage and an end time of the stage.

8. The system of claim 6, wherein the first data structure includes a data structure integrated into a development system and the second data structure includes a data structure integrated into an operations system.

9. The system of claim 6, wherein the facilitator computing device is configured to, in connection with authenticating the artifact, further:
compare the results in the stage record for the first one of the multiple stages stored in the first and second data structure; and
authenticate the artifact when the hash values and the results match.

10. A non-transitory computer-readable storage medium including executable instructions for authenticating a software artifact, which, when executed by a processor, cause the processor to:
for each one of multiple stages of a pipeline:
retrieve metadata and a log for an artifact, the metadata including a result of the stage, a size of the artifact, and a unique name of the stage, the log including line-by-line messages generated by the stage;
generate a keyword count of the log;
perform a hashing function on the log to generate a checksum, which is a value representative of the log;
compile a stage record for the artifact and the stage, the stage record including the checksum, a representation of the keyword count, and the metadata, but not the log; and
store the stage record in a first data structure in one computing device and duplicate the stage record in a second data structure in a different computing device; and later,
authenticate the artifact for a first one of the multiple stages of the pipeline, based on the stage record for the artifact for the first one of the multiple stages in each of the at least two different data structures;
wherein the executable instructions, when executed by the processor, cause the processor to, in connection with authenticating the artifact for the first one of the multiple stages of the pipeline, compare the checksum in the stage record for the first one of the multiple stages from one of the at least two data structures to the checksum in the stage record for the first one of the multiple stages from a different one of the at least two data structures.

11. The non-transitory computer-readable storage medium of claim 10, wherein the metadata further includes a start time of the stage and an end time of the stage.

12. The non-transitory computer-readable storage medium of claim 10, wherein the executable instructions, when executed by the processor, cause the processor to, in connection with authenticating the artifact:
compare the result in the stage record for the first one of the multiple stages from one of the at least two data structures to the result in the stage record for the first one of the multiple stages from a different one of the at least two data structures; and
authenticate the artifact when the checksums and the results match.

* * * * *